United States Patent [19]

Averbuch et al.

[11] Patent Number: 5,530,693
[45] Date of Patent: Jun. 25, 1996

[54] METHOD AND APPARATUS FOR PERFORMING HANDOFF IN A PACKET DATA COMMUNICATION SYSTEM

[76] Inventors: Rod Averbuch, 874 Shambliss La.; Israel A. Cimet, 891 Silver Rock La.; Valy Lev, 1548 Rachel La., all of Buffalo Grove, Ill. 60089

[21] Appl. No.: 465,807

[22] Filed: Jun. 6, 1995

[51] Int. Cl.$^6$ .................................................. H04L 12/56
[52] U.S. Cl. ........................... 370/60; 370/94.1; 379/60; 455/33.2
[58] Field of Search .......................... 370/94.1, 79, 94.2, 370/94.3, 60; 455/33.1, 33.2; 379/60; 375/200, 206

[56] References Cited

U.S. PATENT DOCUMENTS

| | | | |
|---|---|---|---|
| 5,142,550 | 8/1992 | Tymes | 370/94.1 |
| 5,168,498 | 12/1992 | Adams et al. | 370/94.1 |
| 5,392,283 | 2/1995 | Bocci et al. | 370/94.2 |
| 5,416,770 | 5/1995 | Stoner et al. | 370/60 |
| 5,442,681 | 8/1995 | Kotzin et al. | 455/33.1 |
| 5,471,471 | 11/1995 | Freeburg et al. | 370/79 |

*Primary Examiner*—Melvin Marcelo
*Assistant Examiner*—Melissa Kay Carman
*Attorney, Agent, or Firm*—Daniel C. Crilly

[57] ABSTRACT

A packet data communication system (100) that includes a packet data routing network (101, 103) and a plurality of base sites (105–107) employs a method (400, 500) and apparatus for providing packet data to a communication unit (109). The packet data routing network (101, 103) provides a packet (201–208) of data to at least two of the base sites (105–107), one of the base sites (e.g., 105) being the site currently serving the communication unit (109) and the other base site or sites (e.g., 106, 107) being possible handoff targets. The serving base site (105) transmits at least a first portion (e.g., 201–203) of the packet (201–208) to the communication unit (109) and the communication unit (109) receives the transmitted packet or portion thereof. However, if during transmission of the packet (201–208) the communication unit (109) requires a handoff to one (e.g., 106) of the target base sites (106, 107), the communication unit (109) transmits an acknowledgment message (124) to the target base site (106) indicating receipt of the first portion (201–203) of the packet. Upon receipt of the acknowledgment message (124), the target base site (106) transmits at least a second portion (e.g., 204– 208) of the packet to the communication unit (109).

20 Claims, 5 Drawing Sheets

METHOD AND APPARATUS FOR PERFORMING HANDOFF IN A PACKET DATA COMMUNICATION SYSTEM

FIELD OF THE INVENTION

The present invention relates generally to packet data communication systems and, in particular, to a method and apparatus for providing packet data to a communication unit before and after handoff in a packet data communication system.

BACKGROUND OF THE INVENTION

Packet data communication systems are known in both the land mobile and cellular environments. In the land mobile environment, the packet data system includes a packet router, a central controller, a plurality of base sites and a plurality of communication units (e.g., mobile radios, portable radios, or wireless data terminals). In the cellular environment, the packet data system includes a packet router, one or more base site controllers, a plurality of base sites, and a plurality of communication units (e.g., radiotelephones or wireless data terminals).

Land mobile packet data communication systems are typically wide coverage area systems (i.e., one base site services a large coverage area). Thus, a data packet transmission most often occurs from one base site to the communication unit. In a typical data packet transmission, the packet router provides a data packet from a land user to the central controller via one of several communication protocol layers. For example, a first protocol layer (layer 1) comprises a land protocol, such as T1 channel framing, in the fixed network. A second protocol layer (layer 2) typically contains error correction information to allow the communication unit to correct bit errors incurred during transmission of the packet from a base site. A third protocol layer (layer 3) typically includes packet routing information (e.g., the appropriate Internet protocol (IP) address for the communication unit). A fourth protocol layer (layer 4) typically includes an indication of the amount of packets containing the data in the packet data communication. Finally, upper protocol layers (layer 5 and above) contain the actual data in the packet. Thus, the higher the protocol layer used for transmission, the more information that must be analyzed by the communicating entity (i.e., base site, central controller, packet router) and, accordingly, the longer the communication time period. Therefore, protocol layers allow the data to be transferred efficiently from the data source (i.e., sender) to the data recipient (i.e., communication unit) by permitting the intermediate entities to process only the information necessary to deliver the packet to the recipient. The transmission from the packet router to the central controller is generally a layer 3 transmission.

The central controller provides the data packet via layer 1 to the base site serving the communication unit. The base site divides the data packet into data blocks and transmits the data blocks sequentially to the communication unit via layer 2. Thus, layer 2 transmission occurs between the base site and the communication unit only because the communication channel between the base site and the communication unit is the most susceptible to bit errors. Therefore, by limiting layer 2 transmission to communications between the base site and the communication unit, present wide area land mobile systems are throughput efficient. However, wide area land mobile systems are spectrally inefficient because each packet transmission occupies a communication resource, such as a time slot of a radio frequency carrier, and blocks other communication units in the wide coverage area (which may contain many communication units) from using the resource until the packet has been transmitted.

To overcome the spectral inefficiency of wide area systems, land mobile systems have been advantageously incorporating frequency reuse concepts to improve spectral efficiency, thereby creating cellular-type land mobile systems. Like cellular systems, cellular-type land mobile systems include multiple base sites having relatively small coverage areas. Thus, a communication unit is likely to be handed off from one base site to another during the transmission of a data packet as the communication unit moves throughout the communication system. However, packet data transmission techniques of wide area land mobile systems are not readily adaptable to packet data transmissions of cellular-type land mobile systems. With existing wide area land mobile techniques, the data blocks transmitted from the original serving base site after handoff would not be received by the communication unit and would be lost. Therefore, in order to provide the communication unit with the lost information, the communication unit must request the land user to resend the complete data packet so that the packet router can reroute the packet to the handoff base site that is now serving the communication unit. The supplemental transmission of the data packet from the land user inherently increases the overall transmission delay of the data packet and, in addition, is subject to the transmission control protocol (TCP) flow control mechanism in the land system. The TCP flow control mechanism produces additional delays and reduced throughput for packet transmissions from land users in order to control land system congestion. Thus, by requiring the land user to resend the packet upon handoff of the communication unit, unnecessary (and possibly unacceptable) delays would be incurred in a cellular-type system utilizing wide area packet data transmission techniques.

To obviate TCP flow control mechanism delays and throughput reduction in cellular systems, cellular digital packet data (CDPD) systems provide layer 2 transmission between the base site controller (which typically controls multiple base sites) and the communication unit. Thus, when a communication unit is handed off in a cellular system, the communication session is not interrupted because the session is between the base site controller and the communication unit, as opposed to between the base site and the communication unit as in wide area land mobile systems. Therefore, upon handoff, the base site controller provides the unreceived portion of the data packet to the handoff base site without requesting a re-transmission from the land user. However, requiring layer 2 evaluation of the low BER link between the base site and the base site controller and processing of the data blocks at the base site controller increases the effective transmission delay of the data packet and, accordingly, reduces data throughput efficiency.

Therefore, a need exists for a method and apparatus for providing packet data to a communication unit in a packet data communication system that provides the throughput efficiency of wide area land mobile systems and the spectral efficiency of cellular systems.

DESCRIPTION OF A PREFERRED EMBODIMENT

Generally, the present invention encompasses a method and apparatus for providing packet data to a communication unit in a packet data communication system that includes a packet routing network and a plurality of base sites. The packet data routing network provides a packet of data from a data source (e.g., a land host computer) to at least two of the base sites, one of the base sites being the site currently serving the communication unit and the other base site or sites being possible handoff targets. The serving base site transmits at least a first portion of the packet to the communication unit and the communication unit receives the transmitted packet or portion thereof. However, if during transmission of the packet the communication unit requires a handoff to one of the target base sites, the communication unit transmits an acknowledgment message to the target base site indicating receipt of the first portion of the packet. Upon receipt of the acknowledgment message, the target base site transmits at least a second portion (e.g., a remaining portion) of the packet to the communication unit. By providing packet data to the communication unit in this manner, the present invention maintains the high throughput efficiency associated with providing layer 2 packet block transmission between the base site and the communication unit only, as compared with the less efficient layer 2 transmission cellular approaches (i.e., between the communication unit and the packet routing network), while eliminating the need for re-transmission of the complete packet from the data source when part of the data is lost during handoff.

Figure 1:
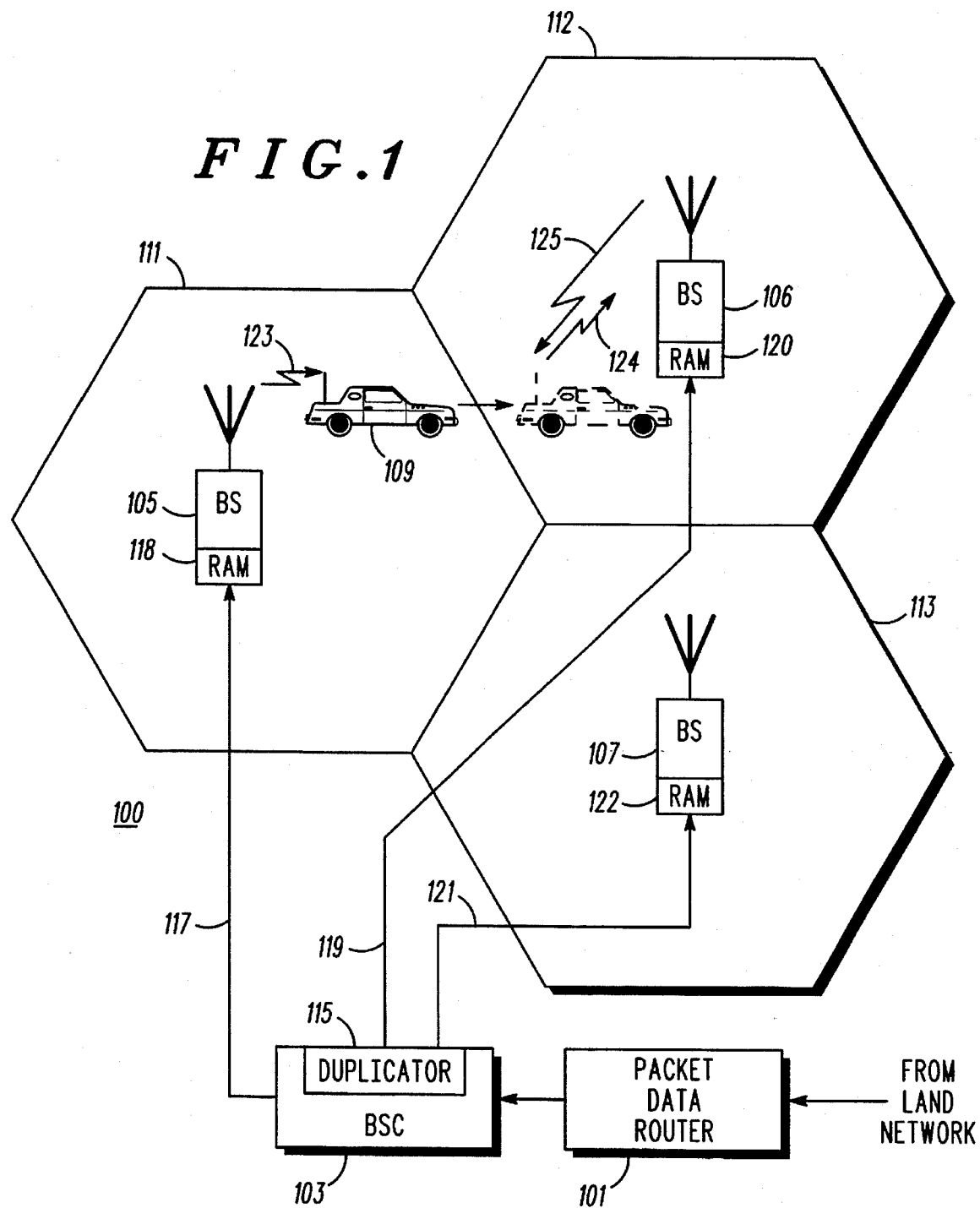
FIG. 1 illustrates a packet data communication system in accordance with the present invention.

The present invention can be more fully understood with reference to FIGS. 1–5. FIG. 1 illustrates a packet data communication system 100 in accordance with the present invention. The packet data communication system 100 includes a packet data router 101, a base site controller (BSC) 103, a plurality of base sites 105–107, and a communication unit 109. The packet data router 101 comprises a known processor that routes data packets to the proper base site controllers (BSCs) based on the packets' Internet protocol (IP) addresses and a preestablished BSC routing list corresponding to the addresses. The BSC 103 preferably comprises a "MOTOROLA" Enhanced Specialized Mobile Radio (ESMR) base site controller modified to include a packet duplicator 115. The packet duplicator 115 is preferably implemented in a software routine. The communication unit 109 preferably comprises a mobile radio, a portable radio, a radiotelephone, or a wireless data terminal. Each base site 105–107 includes, inter alia, a transmitter and receiver to provide data packet communication services to a corresponding service coverage area 111–113. A preferred base site 105–107 is described in detail below with regard to FIG. 3.

Operation of the packet data communication system 100 occurs substantially as follows in accordance with the present invention. When the communication unit 109 desires to become active in the communication system 100, the communication unit 109 registers with the BSC 103 via a serving base site (e.g., 105) in accordance with known techniques. The BSC 103 then informs the packet data router 101 of the communication unit's registration and the packet data router 101 updates its routing list to reflect the communication unit's present location. In addition, the BSC 103 and the communication unit 109 collectively determine possible handoff base sites (e.g., 106, 107) that may be used to serve the communication unit 109 in the event that the communication unit 109 needs to be handed off from the serving base site 105 to another base site (e.g., 106) during a packet data transmission. Mobile-assisted handoff (MAHO) techniques are well-known; thus, no further discussion will be presented except to facilitate an understanding of the present invention.

When a land network user (e.g., a land computer operator or a mobile computer operator interconnected to the land network) desires to send data to the communication unit 109, the land user sends the data to the communication unit 109 in one or more packets via the land network, the packet data router 101, the BSC 103, and the base sites 105, 106. The packet data router 101 receives a packet of the packet data communication from the land network and routes the packet to the appropriate BSC (e.g., 103) based on the address information provided in protocol layer 3 and the router's BSC routing list. The BSC 103 duplicates the data packet and sends the original data packet 117 to the base site 105 currently serving the communication unit 109 and packet copies 119, 121 to all possible handoff base sites 106, 107. In a preferred embodiment, the BSC 103 sends packet copies to all base sites serving coverage areas that are adjacent to (i.e., neighbor) the serving base site's service coverage area 111. Each base site 105–107 divides the packet into predetermined length data blocks (e.g., 440 bits each) and stores the data blocks in a respective random access memory (RAM) 118–122.

When a radio frequency channel becomes available, the serving base site 105 begins transmitting the data blocks to the communication unit on the downlink 123 of a radio frequency communication resource. In a preferred embodiment, the packet data communication system 100 comprises a time division multiple access (TDMA) communication system and the radio frequency communication resource accordingly comprises a time slot of a radio frequency carrier. However, in an alternate embodiment, the radio frequency communication resource might comprise a radio frequency carrier (e.g., in a frequency division multiple access (FDMA) communication system) or an orthogonal code (e.g., in a code division multiple access (CDMA) communication system).

As the communication unit 109 moves toward the outer edge of the serving base site's coverage area 111 and into coverage area 112 (as denoted in FIG. 1 by the arrow and dashed communication unit), the communication unit 109 might determine (e.g., by measuring bit error rate (BER) of protocol layer 2 for the received blocks) that the packet data communication needs to be handed off from the serving base site 105 to a target base site (e.g., 106). When the communication unit 109 determines that a handoff is necessary (e.g., when the BER degrades below a threshold, such as $10^{-3}$), the communication unit informs the BSC 103 via the serving base site 105 that a handoff is necessary. The BSC 103 instructs the serving base site 105 to release the communication unit 109 and instructs the target base site 106 to begin serving the communication unit 109. Once the handoff occurs, the target base site 106 transmits a packet header to the communication unit 109 informing the communication unfit 109 of the handoff. If the handoff occurred during the transmission of the data packet, the communication unit 109 transmits an acknowledgment message 124 to the target base site 106 that indicates which data blocks of the data packet the communication unlit 109 already received from the original serving base site 105. Signaling between the base sites 105, 106 and the communication unit 109 is described in detail below with regard to FIG. 2.

Upon receiving the acknowledgment message from the communication unit 109, the target base site 106 determines which data blocks of the packet still need to be transmitted, extracts those data blocks out of RAM 120, and transmits the data blocks to the communication unit 109 via the downlink 125 of a radio frequency communication resource. The communication unit 109 receives the data blocks from the target base site 106 and combines the data blocks with the data blocks received from the original serving base site 105 to reconstruct the complete data packet.

In a preferred embodiment, the communications between the communication unit 109 and the base sites 105, 106 occur effectively on protocol layer 2; whereas, the communications between the BSC 103 and the base sites 105, 106 occur on a land protocol, such as frame relay or layer 1 framing, since the link between the BSC 103 and the base sites 105, 106 is a low BER link. That is, error correction occurs between the base sites 105, 106 and the communication unit 109 only, in contrast to cellular digital packet data (CDPD) systems which perform layer 2 error correction between the BSC 103 and the communication unit 109. By utilizing layer 2 transmission between the base sites 105, 106 and the communication unit 109 only, the present invention reduces the transmission delay associated with providing layer 2 transmission all the way to the BSC 103, thereby improving throughput efficiency as compared with CDPD systems.

The transmission of data to a communication unit 109 via protocol layer 2 is commonly referred to as a communication session. Consequently, the conveyance of the first portion of the data packet from the original serving base site 105 to the communication unit 109 occurs during a first communication session, while the transmission of the remaining portion of the data packet from the target base site 106 to the communication unit 109 occurs during a second communication session. By contrast, a CDPD system maintains a single communication session during handoff because the layer 2 session is between the BSC 103 and the communication unit 109.

Figure 2:
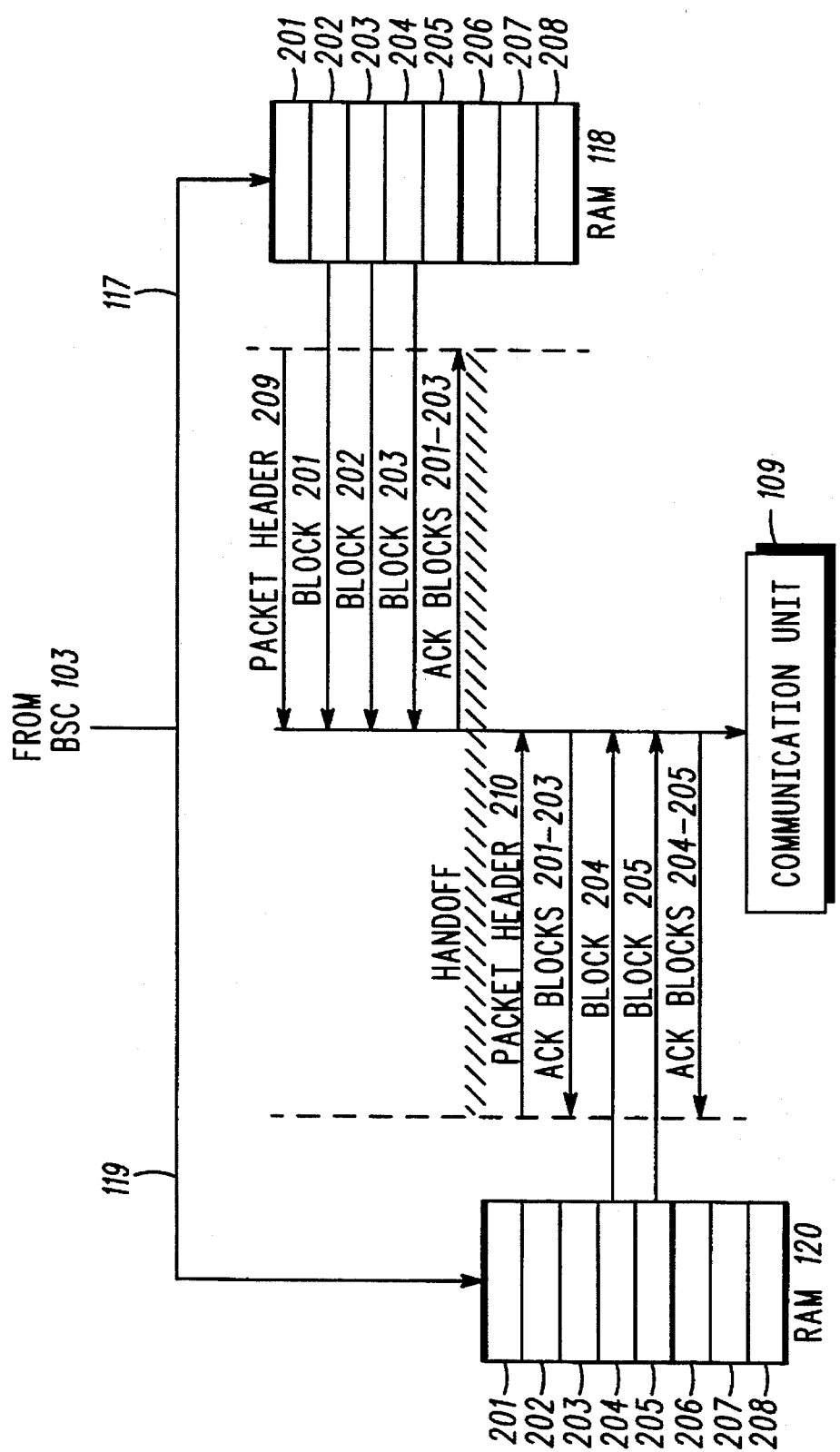
FIG. 2 illustrates transmission of packet data from a serving base site and a target base site to a communication unit in accordance with the present invention.

FIG. 2 illustrates transmission of packet data from the serving base site 105 and the target base site 106 to the communication unit 109 in accordance with the present invention. As depicted in FIG. 2, both the serving base site 105 and the target base site 106 have received the data packet 117, 119 to be delivered to the communication unit 109, divided the data packet into identical data blocks 201–208, and stored the data blocks 201–208 in their respective random access memories (RAMs) 118, 120. In a preferred embodiment, before the serving base site 105 begins transmission of the data blocks 201–208, the serving base site 105 transmits a packet header 209 to the communication unit 109 to inform the communication unit 109 that a packet is about to be sent to it. Subsequent to transmitting the packet header 209, the serving base site 105 begins transmitting the blocks 201–208 of data sequentially to the communication unit 109. In a preferred embodiment, the communication unit 109 transmits an acknowledgment message back to the serving base site 105 to acknowledge the communication unit's reception of a predetermined number of data blocks. For example, as shown in FIG. 2, the communication unit 109 might acknowledge receipt of every three blocks (e.g., 201–203) of data.

If during transmission of the data packet 117, the communication unit 109 is handed off from the serving base site 105 to a target base site 106, the target base site 106 sends a packet header 210 to the communication unit indicating that the target base site has data to transmit to the communication unit 109. After receiving the packet header 210 from the target base site 106, the communication unit 109 transmits an acknowledgment message to the target base site 106 indicating the communication unit's receipt of a first portion of the data blocks 201–208 (i.e., data blocks 201–203). Upon receiving the acknowledgment message, the target base site 106 determines which data blocks the communication unit 109 has not received—in this case, data blocks 204–208—and begins transmitting the unreceived data blocks 204–208 sequentially to the communication unit 109. Similar to its acknowledgment of data blocks 201–203 received from the serving base site 105, the communication unit 109 might acknowledge receipt of a particular number of data blocks (e.g., two) from the target base site 106. If no additional handoffs occur, the target base site 106 transmits the remaining data blocks 204–208 to the communication unit 109. In a preferred embodiment, the last data block 208 includes an end of transmission notification that informs the communication unit 109 that no more data can be expected for the data packet 117. If an additional handoff occurs, the process described above is repeated between the communication unit 109 and the new handoff base site. Once the communication unit 109 has received all the data blocks 201–208 constituting the data packet 117, the communication unit 109 reconstructs the data packet 117 by concatenating the received data blocks 201–208.

Therefore, the present invention provides a technique for conveying packet data to a communication unit before and after handoff that does not require re-transmission of the entire data packet from the land network user as in prior art systems that use layer 2 transmission between the base site and the communication unit only. The present invention provides a copy of the data packet to each handoff target base site at substantially the same time as the original data packet is provided to the base site currently serving the communication unit. Thus, when a handoff occurs with the present invention, the communication unit informs the handoff base site which portion of the packet has been received and the handoff base site transmits only the portion of the packet that has not been received. By requiring the handoff base site to transmit only the unreceived portion of the data packet, the present invention reduces packet transmission delay under handoff conditions because the present invention is not affected by the land network's TCP control flow mechanism when data is lost during handoff. By contrast, prior art systems that provide layer 2 transmission between the base site and the communication unit only are affected by the TCP control flow mechanism when data is lost during handoff and the land user must resend the data packet.

Figure 3:
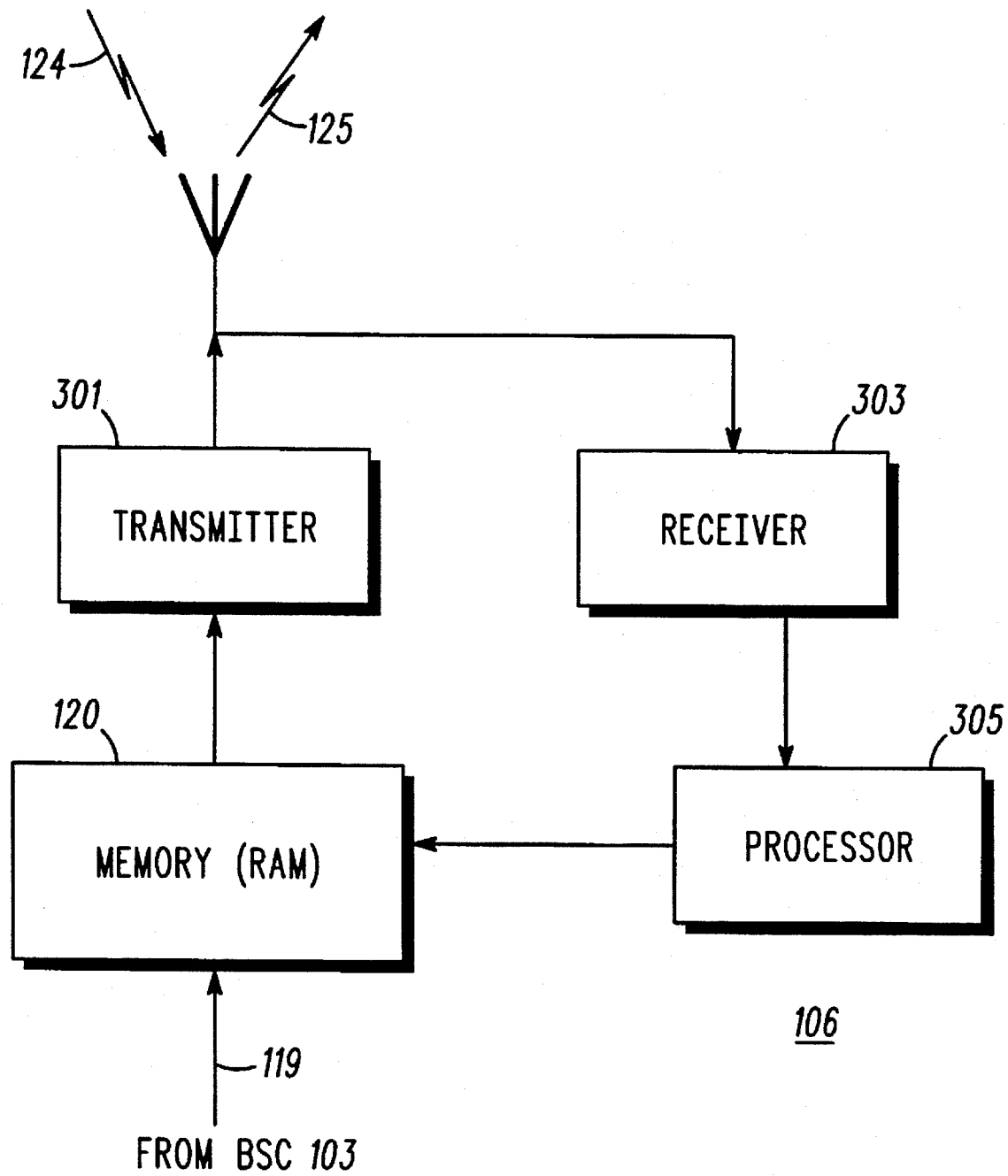
FIG. 3 illustrates a preferred base site in the packet data communication system of FIG. 1.

FIG. 3 illustrates a preferred base site 106 in the packet data communication system 100 of FIG. 1. The base site 106 comprises a transmitter 301, a receiver 303, a processor 305, and the RAM 120. The transmitter 301 and receiver 303 are well-known and preferably comprise a digital transmitter and receiver, respectively. The processor 305 preferably comprises a microprocessor. In a preferred embodiment, the RAM 120 and the processor 305 are separate entities. However, in an alternate embodiment, the RAM 120 and the processor 305 might reside in a single integrated circuit.

Operation of the handoff target base site 106 occurs substantially as follows in accordance with the present invention. Although the following discussion is with regard to operation of the base site 106 to which the communication unit is handed off, the discussion is also applicable to the communication unit's original serving base site 105 because the serving base site 105 might also serve as a handoff target for another communication unit. The base site 106 receives the data packet duplicate 119 from the BSC 103, divides the packet 119 into data blocks, and stores the data blocks in memory (i.e., RAM 120) as discussed above with regard to FIGS. 1 and 2. When the base site 106 receives the acknowledgment message 124 from the communication unit, the base site 106 processes the message 124 in the receiver 303 using well-known techniques to produce a digital representation of the message 124. The digital representation of the message 124 is provided to the processor 305 and the processor 305 determines from the digital representation of the message 124 which data blocks of the packet 119 the communication unit has received. In a preferred embodiment, the acknowledgment message 124 comprises an identification of the communication unit and the number of data blocks received. Thus, the processor 305 determines which data block of the packet 119 the base site should begin to transmit. For example, if the acknowledgment message 124 indicates that the first three data blocks have been received by the communication unit, the processor 305 instructs the RAM 120 to begin providing data to the transmitter 301 beginning with the fourth block of data.

Upon receiving its instructions from the processor 305, the RAM 120 begins providing data blocks of the stored data packet 119 sequentially to the transmitter 301 for transmission to the communication unit. The transmitter 301 then transmits the data blocks to the communication unit on the downlink 125 of a radio frequency communication resource.

Figure 4:
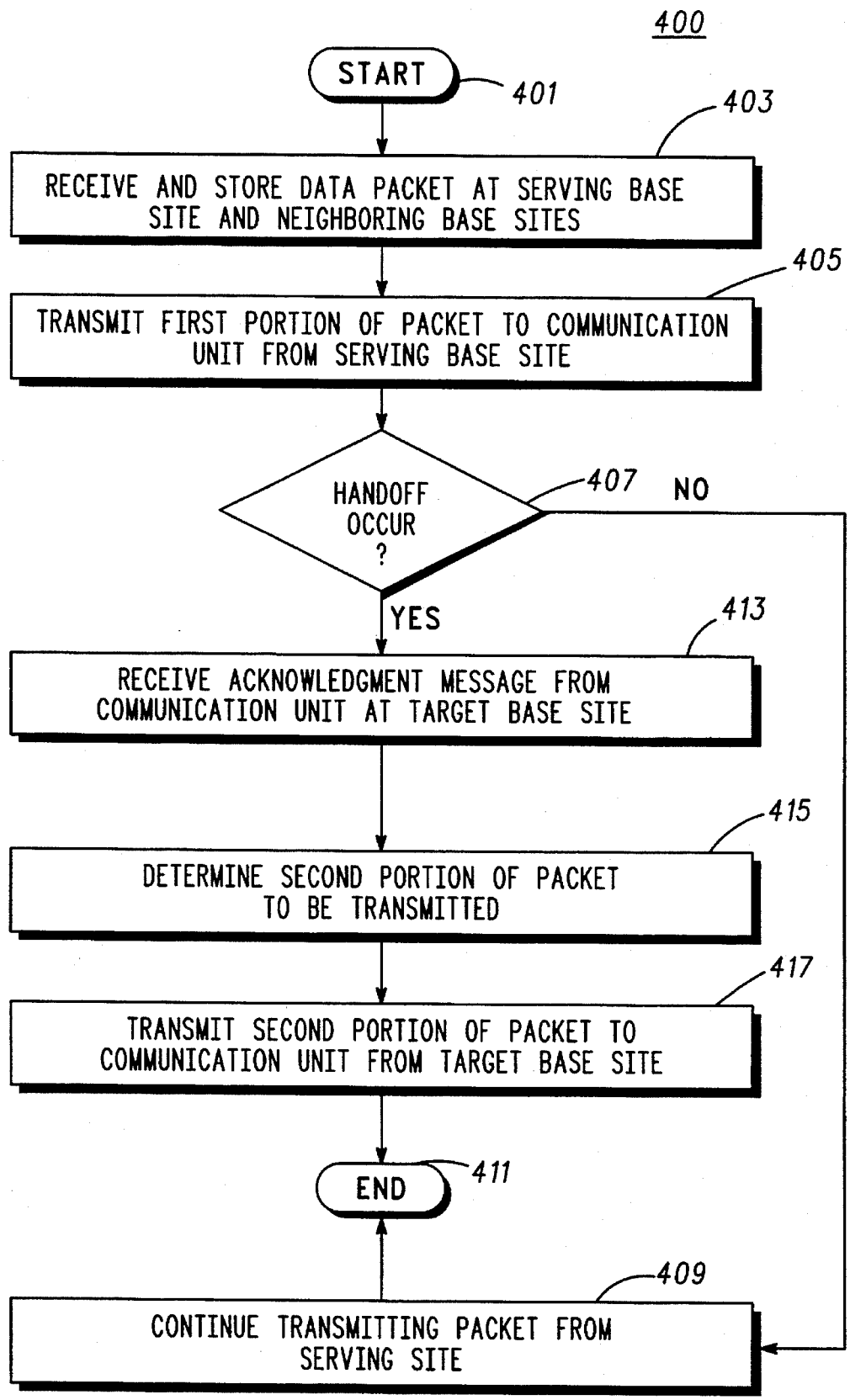
FIG. 4 illustrates a logic flow diagram of steps executed by a serving base site and a target base site to provide packet data to a communication unit in accordance with the present invention.

FIG. 4 illustrates a logic flow diagram 400 of steps executed by a serving base site and a target base site to provide packet data to a communication unit in accordance with the present invention. The logic flow begins (401) when the base site currently serving (i.e., providing packet data to) the communication unit and handoff target base sites serving neighboring coverage areas adjacent to the coverage area of the serving base site receive (403) a data packet for the communication unit and store (403) the data packet in memory. The base site currently serving the communication unit (i.e., the serving base site) transmits (405) a first portion of the data packet to the communication unit. The serving base site and a target base site then determine (407) whether the communication unit is going to be handed off from the serving base site to the target base site. In a preferred embodiment, this determination is made based on signaling from the BSC. When the communication unit determines that the signal quality (e.g., BER) of the downlink signal from the serving base site is acceptable (i.e., is greater than or equal to a threshold value), the BSC does not instruct the serving base site to handoff the communication unit to a target base site. In this case, the serving base site continues (409) transmitting the remaining portion of the data packet to the communication unit and the logic flow ends (411).

When the communication unit determines that the downlink signal quality is unacceptable (i.e., has degraded below the threshold value), the communication unit informs the BSC, via the serving base site, of the signal quality degradation and provides the BSC with a prioritized list of target base sites in accordance with known MAHO techniques. When the BSC determines which target base site is the handoff site, the BSC informs the serving base site and the target base site of the upcoming handoff. After the handoff of the communication unit to the target base site, the target base site receives (413) an acknowledgment message from the communication unit indicating the communication unit's receipt of the first portion of the data packet from the original serving base site. Based on the acknowledgment message, the target base site determines (415) a second portion of the data packet to transmit to the communication unit. In a preferred embodiment, the second portion comprises the remaining portion of the data packet that was not transmitted by the serving base site. Once the target base site determines (415) the second portion, the target base site transmits (417) the second portion of the data packet to the communication unit and the logic flow ends (411).

Figure 5:
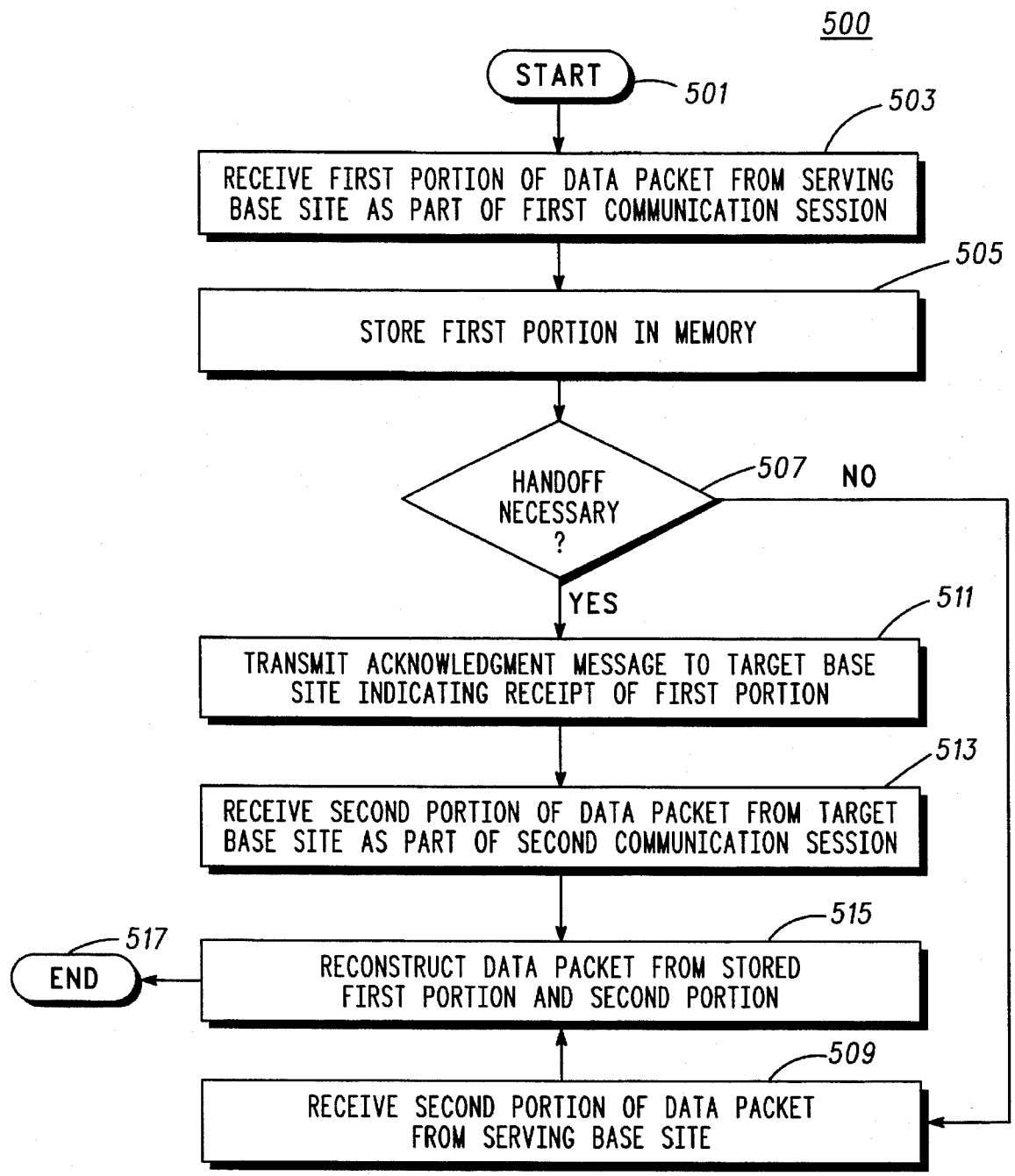
FIG. 5 illustrates a logic flow diagram of steps executed by a communication unit to acquire packet data from a serving base site and a target base site in accordance with the present invention.

FIG. 5 illustrates a logic flow diagram 500 of steps executed by a communication unit to acquire packet data from a serving base site and a target base site in accordance with the present invention. The logic flow begins (501) when the communication unit receives (503) a first portion of a data packet from the serving base site as part of a first communication session. In a preferred embodiment, the communication unit receives the first portion via an error correction protocol layer (layer 2) that is transmitted uniquely between the serving base site and the communication unit, as opposed to between the BSC, or packet data router, and the communication unit as in a CDPD system. Upon receiving the first portion, the communication unit stores (505) the first portion in a memory.

The communication unit then determines (507) whether a handoff is necessary using MAHO techniques. When a handoff is not necessary, the communication unit receives (509) a second portion of the data packet via protocol layer 2 from the serving base site. However, when a handoff is necessary and after completion of the handoff from the serving base site to a target base site, the communication unit transmits (511) an acknowledgment message to the target base site indicating its receipt of the first portion of the data packet from the original serving base site. The communication unit then receives (513) the second portion of the data packet via protocol layer 2 from the target base site as part of a second communication session (i.e., a communication session strictly between the target base site and the communication unit). Once the communication unit has received the first and second portions of the data packet, the communication unit reconstructs (515) the data packet from the stored first portion and the received second portion and the logic flow ends (517). In a preferred embodiment, the packet reconstruction comprises concatenating the second portion to the stored first portion to produce the data packet.

The present invention encompasses a method and apparatus for providing packet data to a communication unit in a packet data communication system. With this invention, packet data can be provided to the communication unit with high throughput efficiency before and after handoff by providing layer 2 packet block transmission sessions between the base sites and the communication unit only, in contrast to the less efficient layer 2 transmission of cellular packet data approaches. In addition, the present invention provides copies of the data packet to each target base site, thereby obviating the need for re-transmission of the complete packet from the land network user after handoff, as would be the case in applying a typical land mobile packet data approach to a radio packet communication system that permits base site handoffs.

While the present invention has been particularly shown and described with reference to particular embodiments thereof, it will be understood by those skilled in the art that various changes in form and details may be made therein without departing from the spirit and scope of the present invention.

What we claim is:

1. In a communication system including a plurality of base sites, a packet data routing network, and a communication unit, a method for providing packet data to the communication unit, the method comprising the steps of:

a) providing, by the packet data routing network, a packet of data to at least two base sites of the plurality of base sites;

b) transmitting, by a first base site of the at least two base sites, a first portion of the packet to the communication unit;

c) receiving, by the communication unit, the first portion to produce a received first portion;

d) upon handoff of the communication unit from the first base site to a second base site of the at least two base sites, transmitting, by the communication unit, an acknowledgment message to the second base site, the acknowledgment message indicating receipt of the first portion; and e) upon receipt of the acknowledgment message, transmitting, by the second base site, a second portion of the packet to the communication unit.

2. The method of claim 1, further comprising the steps of:

f) responsive to the step of receiving the first portion, storing, by the communication unit, the received first portion to produce a stored first portion;

g) receiving, by the communication unit, the second portion to produce a received second portion; and h) reconstructing, by the communication unit, the packet from the stored first portion and the received second portion.

3. The method of claim 1, wherein step (b) comprises the step of transmitting the first portion of the packet via a first protocol layer of a plurality of communication protocol layers.

4. The method of claim 3, wherein step (a) comprises the step of providing the packet of data to the at least two base sites via a second protocol layer of the plurality of communication protocol layers.

5. The method of claim 4, wherein the second protocol layer comprises a packet routing layer.

6. The method of claim 3, wherein the first protocol layer comprises an error correction layer.

7. The method of claim 1, wherein step (b) comprises the step of transmitting the first portion of the packet during a first communication session.

8. The method of claim 1, wherein step (e) comprises the step of transmitting the second portion of the packet during a second communication session.

9. The method of claim 1, wherein step (e) comprises the step of transmitting a remaining portion of the packet to the communication unit, wherein the packet consists of the first portion and the remaining portion only.

10. In a communication system including a plurality of base sites, a packet data routing network, and a communication unit, a method for the plurality of base sites to provide packet data to the communication unit, the method comprising the steps of:

a) receiving, by a first base site of the plurality of base sites, a packet of data from the packet data routing network;

b) transmitting, by the first base site, a first portion of the packet to the communication unit;

c) receiving, by a second base site of the plurality of base sites, the packet of data from the packet data routing network;

d) storing, by the second base site, the packet in memory to produce a stored packet;

e) upon handoff of the communication unit from the first base site to the second base site, receiving, by the second base site, an acknowledgment message from the communication unit, the acknowledgment message indicating receipt of the first portion; and f) upon receipt of the acknowledgment message, transmitting, by the second base site, a second portion of the stored packet to the communication unit.

11. The method of claim 10, wherein step (b) comprises the step of transmitting the first portion of the packet via a first protocol layer of a plurality of communication protocol layers.

12. The method of claim 11, wherein step (a) comprises the step of receiving the packet of data via a second protocol layer of the plurality of communication protocol layers.

13. In a communication system including a plurality of base sites, a packet data routing network, and a communication unit, a method for the communication unit to acquire packet data from the plurality of base sites, the method comprising the steps of:

a) receiving a first portion of a packet from a first base site of the plurality of base sites during a first communication session to produce a received first portion;

b) storing the received first portion in a memory to produce a stored first portion;

c) upon handoff of the communication unit from the first base site to a second base site of the plurality of base sites, receiving a second portion of the packet from the second base site during a second communication session to produce a received second portion; and d) reconstructing the packet from the stored first portion and the received second portion.

14. The method of claim 13, wherein step (d) comprises the step of concatenating the stored first portion and the received second portion to produce the packet.

15. In a radio frequency communication system including a plurality of base sites, a packet data routing network, and a communication unit, a method for providing packet data to the communication unit, the method comprising the steps of:

a) providing, by the packet data routing network, a packet of data to at least two base sites of the plurality of base sites via a first protocol layer of a plurality of communication protocol layers;

b) transmitting, by a first base site of the at least two base sites, a first portion of the packet to the communication unit via a second protocol layer of the plurality of communication protocol layers;

c) receiving, by the communication unit, the first portion to produce a received first portion;

d) storing, by the communication unit, the received first portion to produce a stored first portion;

e) upon handoff of the communication unit from the first base site to a second base site of the at least two base sites, transmitting, by the communication unit, an acknowledgment message to the second base site, the acknowledgment message indicating receipt of the first portion;

f) upon receipt of the acknowledgment message, transmitting, by the second base site, a second portion of the packet to the communication unit via the second protocol layer;

g) receiving, by the communication unit, the second portion to produce a received second portion; and h) reconstructing, by the communication unit, the packet from the stored first portion and the received second portion.

16. In a packet data communication system, an apparatus for providing packet data to a communication unit, the apparatus comprising:
   a packet data routing network that routes a data packet within the packet data communication system;
   a first base site coupled to the packet data routing network, the first base site including a transmitter to transmit a first portion of the data packet to the communication unit;
   a second base site coupled to the packet data routing network, the second base site comprising:
      a memory that stores the data packet to produce a stored data packet;
      a processor, coupled to the memory, that determines a second portion of the stored data packet to be transmitted to the communication unit after the communication unit has been handed off from the first base site to the second base site; and
      a transmitter, coupled to the processor, to transmit the second portion to the communication unit.

17. The apparatus of claim 16, wherein the packet data routing network comprises a packet data router and a base site controller.

18. In a packet data communication system, an apparatus for providing packet data to a communication unit, the apparatus comprising:
   a packet data router that provides a packet of data;
   a packet duplicator, coupled to the packet data router, that duplicates the packet to produce a packet duplicate;
   a base site controller, coupled to the packet data router and packet duplicator, that distributes the packet and the packet duplicate;
   a first base site, coupled to the base site controller, that transmits a first portion of the packet to the communication unit;
   a second base site, coupled to the base site controller, the second base site comprising:
      a memory that stores the packet duplicate to produce a stored packet;
      a processor, coupled to the memory, that determines a second portion of the stored packet to be transmitted to the communication unit after the communication unit has been handed off from the first base site to the second base site; and
      a transmitter, coupled to the processor, that transmits the second portion to the communication unit.

19. In a communication system that includes a plurality of base sites, a packet data routing network, and a communication unit, a method for providing packet data to the communication unit, the method comprising the steps of:
   a) providing, by the packet data routing network, a packet of data to at least two base sites of the plurality of base sites;
   b) transmitting, by a first base site of the at least two base sites, a first portion of the packet to the communication unit; and
   c) upon handoff of the communication unit from the first base site to a second base site of the at least two base sites, transmitting, by the second base site, a second portion of the packet to the communication unit.

20. In a communication system that includes a plurality of base sites, a packet data routing network, and a communication unit, a method for the communication unit to acquire packet data from the plurality of base sites, the method comprising the steps of:
   a) receiving a first portion of a packet from a first base site of the plurality of base sites during a first communication session to produce a received first portion;
   b) upon handoff of the communication unit from the first base site to a second base site of the plurality of base sites, receiving a second portion of the packet from the second base site during a second communication session to produce a received second portion; and
   c) reconstructing the packet from the received first portion and the received second portion.

* * * * *